US012805490B1

(12) United States Patent
Dunston

(10) Patent No.: US 12,805,490 B1
(45) Date of Patent: Nov. 24, 2026

(54) GRAVITY FEED CONTROL DEVICE AND METHOD OF USE

(71) Applicant: Dustin Dunston, Charleston, AR (US)

(72) Inventor: Dustin Dunston, Charleston, AR (US)

( * ) Notice: Subject to any disclaimer, the term of this patent is extended or adjusted under 35 U.S.C. 154(b) by 0 days.

(21) Appl. No.: 19/442,417

(22) Filed: Jan. 7, 2026

(51) Int. Cl.
*A01K 39/01* (2006.01)
*A01K 39/012* (2006.01)

(52) U.S. Cl.
CPC .................................. *A01K 39/012* (2013.01)

(58) Field of Classification Search
CPC ........ A01K 39/012; A01K 61/02; A01K 5/01; A01K 5/0225; A01K 5/004
See application file for complete search history.

(56) References Cited

U.S. PATENT DOCUMENTS 3,578,209 A * 5/1971 Fraser .................. A01K 5/0291 222/650
5,127,439 A 7/1992 Stanchina
5,875,733 A 3/1999 Chen
6,694,917 B1 * 2/2004 Wang ................... A01K 5/0291 119/51.11
11,359,743 B2 6/2022 Liu
11,617,355 B2 * 4/2023 Wallmeier ............. A01K 61/80 119/230
11,638,412 B2 * 5/2023 Svrcek ................. A01K 5/0291 119/51.11
12,161,092 B2 12/2024 Michalec
2003/0116093 A1 * 6/2003 Springett ............. A01K 5/0291 119/51.04
2006/0207511 A1 * 9/2006 Deng ..................... A01K 61/85 119/51.04
2021/0400911 A1 12/2021 King
2022/0394958 A1 * 12/2022 Wallmeier ............. A01K 61/85
2023/0236053 A1 * 7/2023 Treitel .................... G01F 11/24 222/71
2024/0175502 A1 5/2024 Min

FOREIGN PATENT DOCUMENTS

CN 207720954 8/2018
EP 3674591 8/2019
WO WO-2017175213 A1 * 10/2017 ............ G01F 15/12

* cited by examiner

*Primary Examiner* — Ebony E Evans

(57) ABSTRACT

A gravity feed control device for converting a gravity feed station for remote automation includes a sliding door, a pipe overlay, an actuator, and a controller. The sliding door is half-pipe shaped and is positionable over a feed opening in a feed pipe. The pipe overlay has an aperture positioned therein and can be attached to the feed pipe with the aperture in alignment with the feed opening. The sliding door is slidably retained within a cavity that is defined by the pipe overlay and the feed pipe. The actuator is attached to the pipe overlay and is operatively engaged to the sliding door. The controller selectively activates the actuator to slide the sliding door between first and second configurations, wherein the feed opening is closed and at least partially open, respectively, so that a flowable material can pass from the feed pipe through the aperture.

19 Claims, 7 Drawing Sheets

GRAVITY FEED CONTROL DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feed control devices and more particularly pertains to a new feed control device for converting a gravity feed station for remote automation. Automating gravity feed stations would relieve operators of a repetitive task and increase efficiency by enabling the operators to perform more productive tasks.

(2) Description of Related Art Including Information Disclosed Under 37 CFR 1.97 and 1.98

The prior art relates to feed control devices, such as those used in livestock applications, wherein a feed control device is manually actuated with strings or cables. Most typically, feed control devices utilize flat plate and do not include a sliding door having a half-pipe shape.

BRIEF SUMMARY OF THE INVENTION

An embodiment of the disclosure meets the needs presented above by generally comprising a sliding door and a pipe overlay. The sliding door is half-pipe shaped and has an internal diameter and an external diameter. The pipe overlay has an inner diameter that is complementary to the external diameter. The sliding door is configured to be positioned over and to cover a feed opening in a bottom half of a feed pipe, which has an outside diameter that is complementary to the internal diameter of the sliding door. The pipe overlay has an aperture positioned therein and is adapted to be selectively attached to the feed pipe. The pipe overlay is configured to be positioned around and fastened to the feed pipe so that the aperture is aligned with the feed opening and so that the sliding door is slidably retained within a cavity that is defined by the pipe overlay and the feed pipe. An actuator is attached to the pipe overlay and is operatively engaged to the sliding door. A controller is in communication with the actuator to selectively activate the actuator to slide the sliding door between a first configuration, wherein the feed opening is closed by the sliding door, and a second configuration, wherein the sliding door is slid within the cavity so that the feed opening is at least partially open and so that a flowable material can pass from the feed pipe through the aperture.

An embodiment of the disclosure includes a method converting a gravity feed station for remote automation. The method comprises the steps of positioning a sliding door of a gravity feed control device, as per the disclosure above, over a feed opening in a bottom half of a feed pipe having an outside diameter that is complementary to the internal diameter of the sliding door. The pipe overlay then is positioned around the feed pipe to slidably retain the sliding door is within the cavity defined by the pipe overlay and the feed pipe. The pipe overlay is attached to the feed pipe by tightening gear clamps around a first half flange and its associated second half flange. The controller then can be utilized to selectively activate the actuator. Sliding, by the actuator, of the sliding door between the first and second configurations enables flowing of the flowable material from the feed pipe through the aperture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
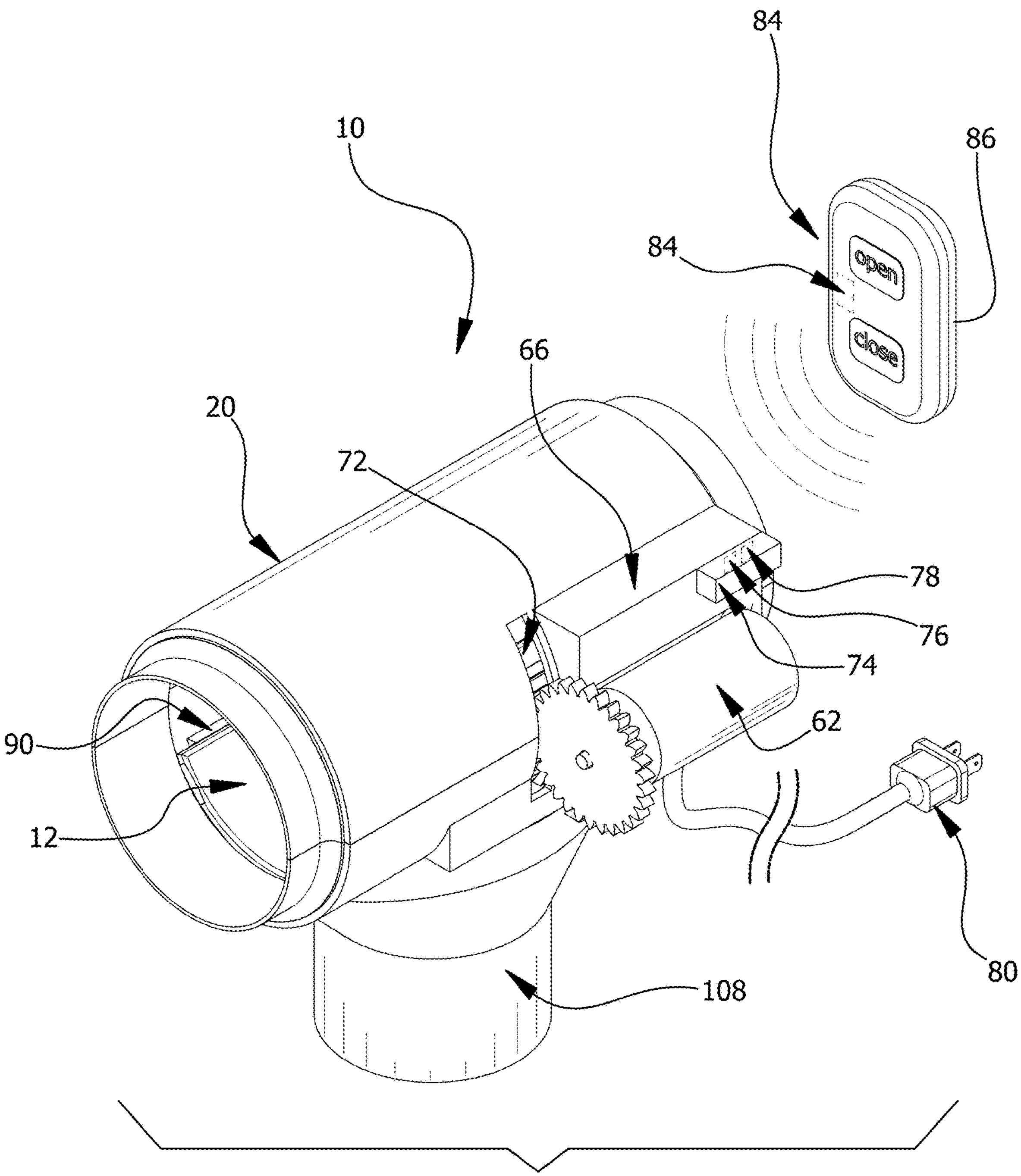
FIG. 1 is an isometric perspective view of a gravity feed control device according to an embodiment of the disclosure.
Figure 2:
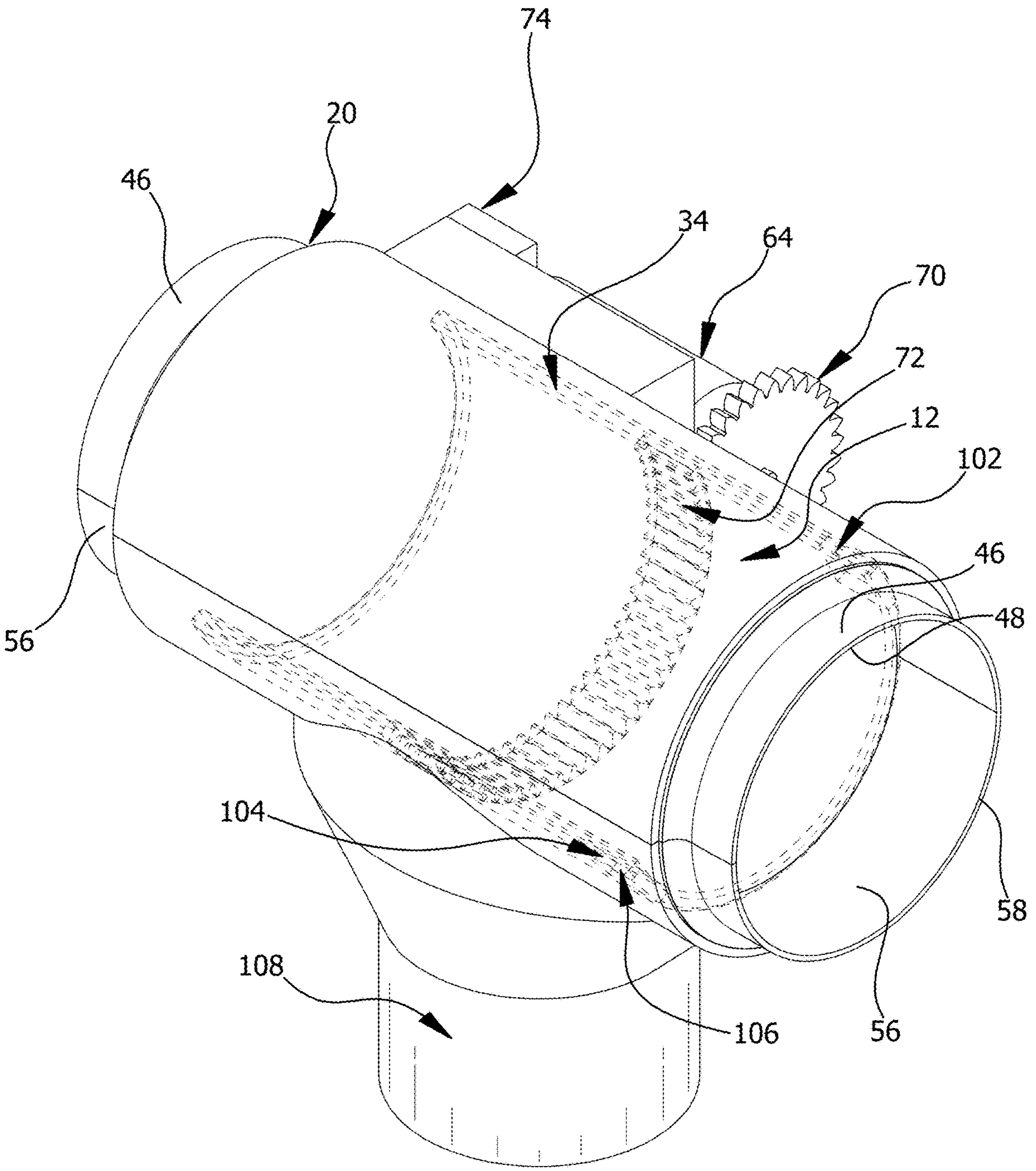
FIG. 2 is a closed view of an embodiment of the disclosure.
Figure 3:
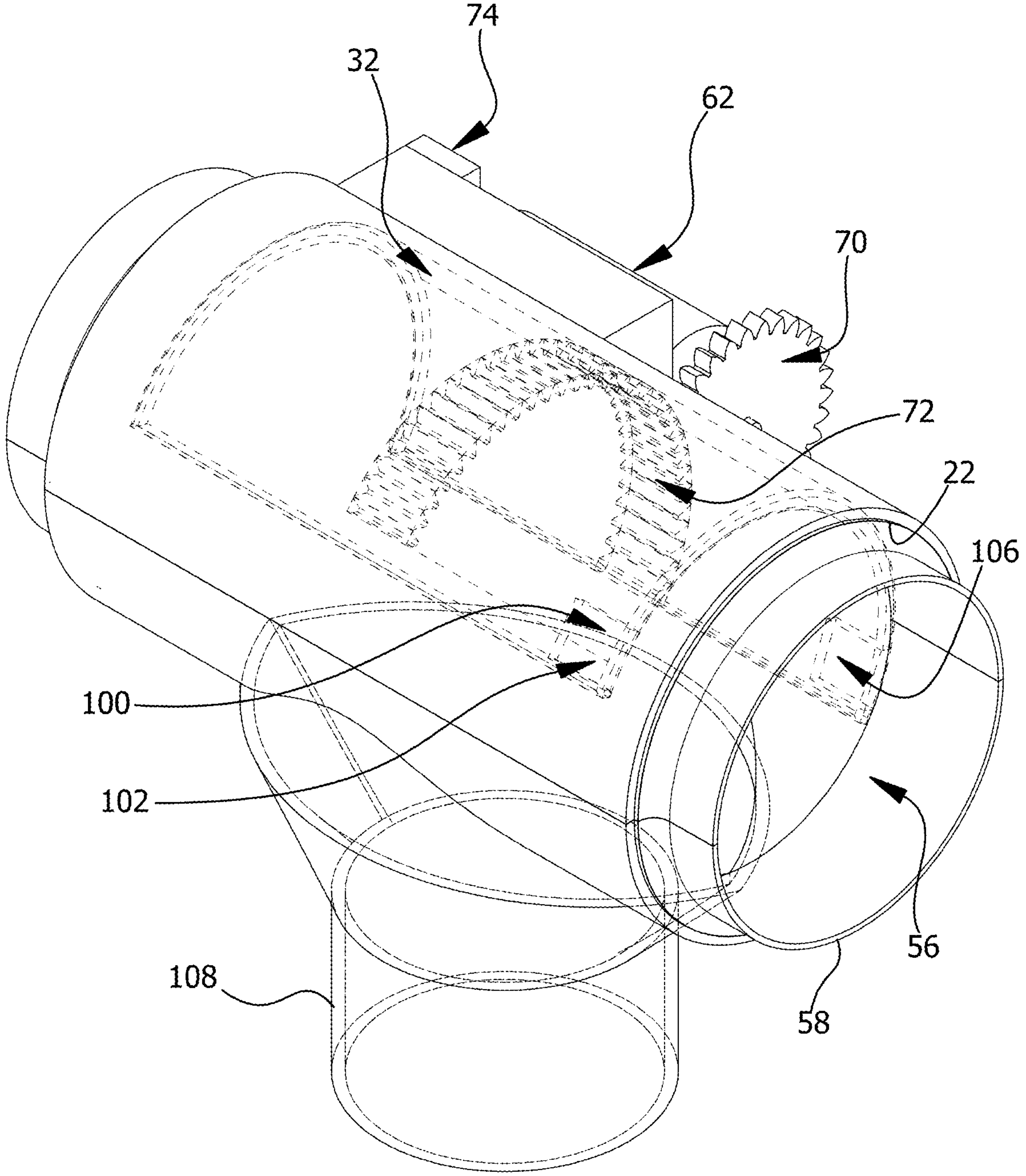
FIG. 3 is an open view of an embodiment of the disclosure.

With reference now to the drawings, and in particular to FIGS. 1 through 7 thereof, a new feed control device embodying the principles and concepts of an embodiment of the disclosure and generally designated by the reference numeral 10 will be described.

As best illustrated in FIGS. 1 through 7, the gravity feed control device 10 generally comprises a sliding door 12, which is half-pipe shaped, and a pipe overlay 20. The sliding door 12 has an internal diameter 14, an external diameter 16, and an outer face 18. The pipe overlay 20 has an inner diameter 22 that is complementary to the external diameter 16 of the sliding door 12. The sliding door 12 is configured to be positioned over and to cover a feed opening 24 in a bottom half 26 of a feed pipe 28, which has an outside diameter 30 that is complementary to the internal diameter 14 of the sliding door 12. The pipe overlay 20 has an aperture 32 positioned therein and is adapted to be selectively attached to the feed pipe 28 with the pipe overlay 20 and the feed pipe 28 then defining a cavity 34. The pipe overlay 20 thus is configured to be positioned around and fastened to the feed pipe 28 so that the aperture 32 is aligned with the feed opening 24 and so that the sliding door 12 is slidably retained within the cavity 34.

The pipe overlay 20 comprises an upper half pipe 36 and a lower half pipe 38. The upper half pipe 36 has opposite ends 40 and a front face 42. A first slot 44 extends into the front face 42. Each first half flange 46 of a pair of first half flanges 46 is attached to a respective opposite end 40 of the upper half pipe 36. Each first half flange 46 has an inward diameter 48 that is complementary to the outside diameter 30 of the feed pipe 28. The lower half pipe 38 has opposing ends 50 and a forward face 52. A second slot 54 extends into the forward face 52. The aperture 32 is substantially centrally positioned in the lower half pipe 38. The lower half pipe 38 is selectively attachable to the upper half pipe 36 to generate the pipe overlay 20 with the second slot 54 being in alignment with the first slot 44. Each second half flange 56 of a pair of second half flanges 56 is attached singly to a respective opposing end 50 of the lower half pipe 38. Each second half flange 56 has an interior diameter 58 that is complementary to the outside diameter 30 of the feed pipe 28.

Figure 6:
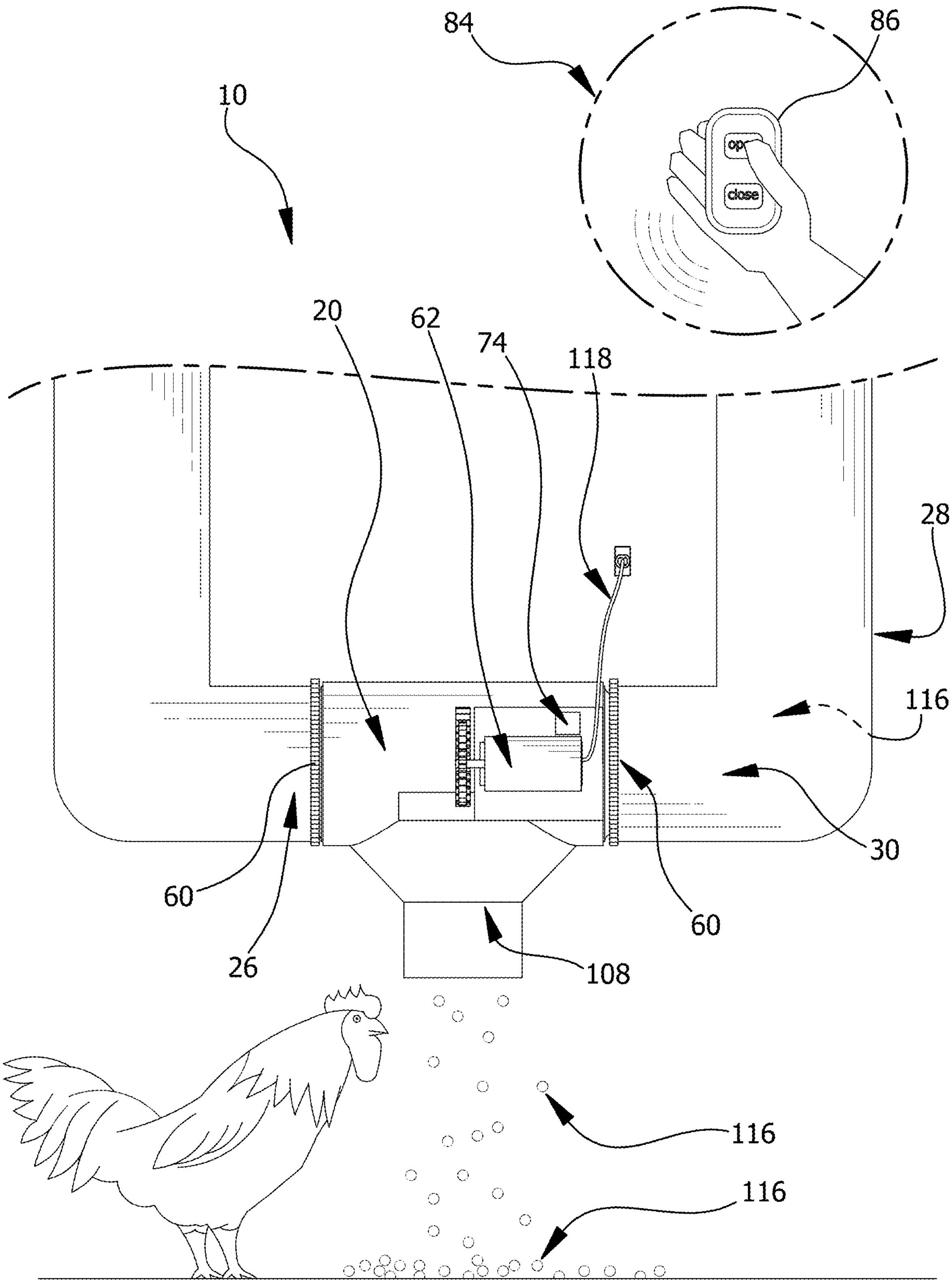
FIG. 6 is an in-use view of an embodiment of the disclosure.
Figure 7:
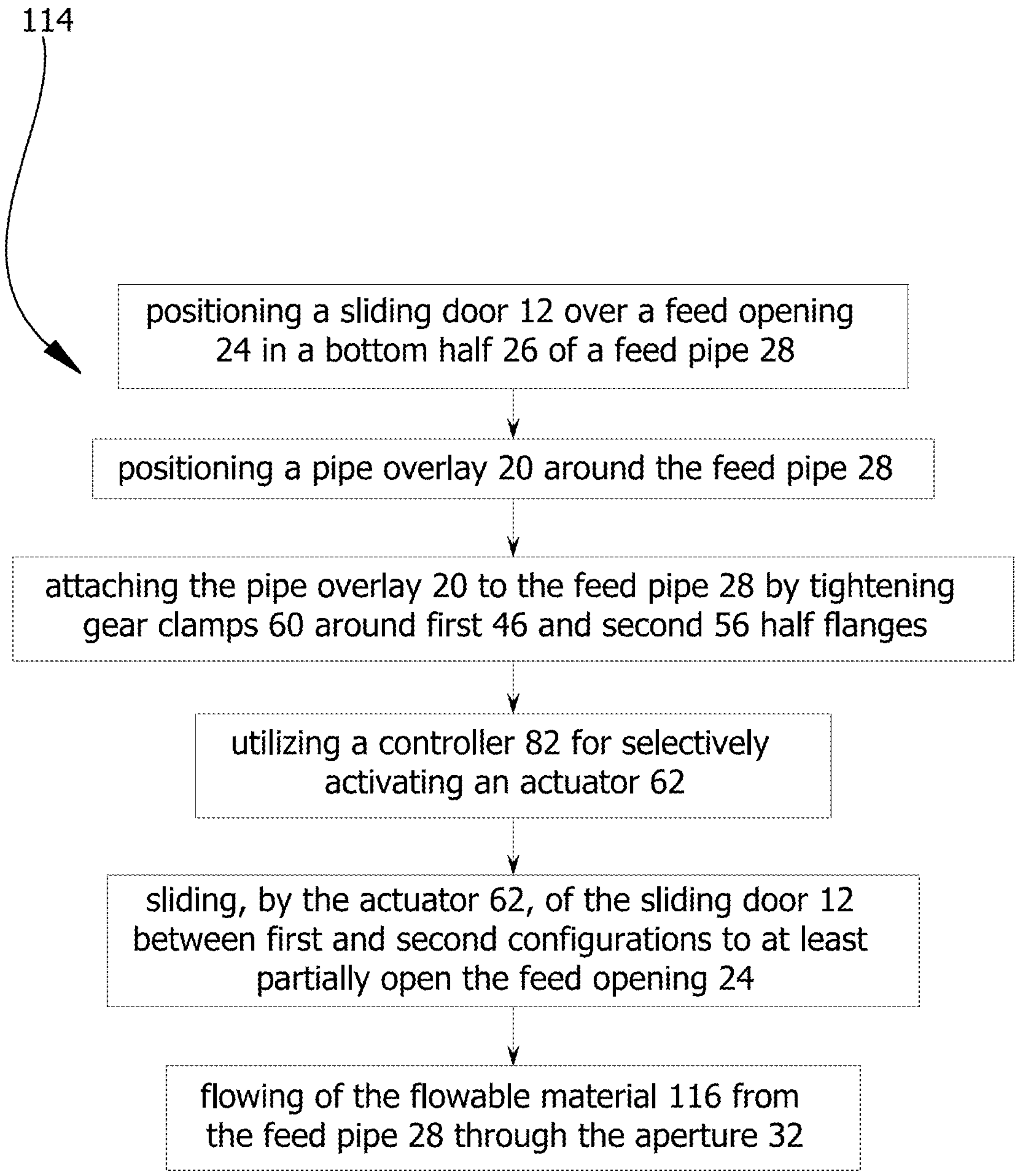
FIG. 7 is a flow chart for a method utilizing an embodiment of the disclosure.

Each first half flange 46 and an associated second half flange 56 are configured to be tightened to the feed pipe 28, using a respective gear clamp 60, or the like, to attach the pipe overlay 20 to the feed pipe 28, as is shown in FIG. 6. Alternatively, and depending on composition of the pipe overlay 20, welding or adhesives could be used to attach the pipe overlay 20 to the feed pipe 28. The first half flanges 46 and the second half flanges 56 effectively taper the pipe overlay 20 to the feed pipe 28 and provide a means for attaching the pipe overlay 20 to the feed pipe 28.

An actuator 62 is attached to the pipe overlay 20 and is operatively engaged to the sliding door 12. The actuator 62 may comprise a motor 64, which is attached to the upper half pipe 36. A mounting plate 66 may be attached to and positioned between the motor 64 and the upper half pipe 36 to provide more stable mounting of the motor 64 to the pipe overlay 20. The motor 64 is reversible and comprises a shaft 68, to which is attached a pinion gear 70. The pinion gear 70 extends through the first slot 44 and the second slot 54. A rack gear 72, which extends into the outer face 18 of the sliding door 12, is gearedly engaged to the pinion gear 70. Thus, as the motor 64 rotates the shaft 68, the pinion gear 70 rotates concurrently and motivates the sliding door 12 between the first and second configurations.

A control module 74 is attached to the pipe overlay 20. The control module 74 comprises a unit transceiver 76 and a microcontroller 78, which is operatively coupled to the motor 64 and to the unit transceiver 76. A power module 80 is operatively coupled to the control module 74. Typically, the power module 80 comprises a power cord 118, as is shown in the figures, but also may include a battery (not shown).

A controller 82 is in communication with the actuator 62 to selectively activate the actuator 62 to slide the sliding door 12 between a first configuration, wherein the feed opening 24 is closed by the sliding door 12, and a second configuration, wherein the sliding door 12 is slid within the cavity 34 so that the feed opening 24 is at least partially open and so that a flowable material 116 can pass from the feed pipe 28 through the aperture 32. The present invention is applicable for use in a variety of applications, such as, but not limited to, agricultural feeding, industrial applications wherein flowable solids are utilized, and the like. Additionally anticipated is a sliding door 12 equipped with a gasket (not shown), which would enable use of the gravity feed control device 10 with liquids, slurries, suspensions, or the like.

The controller 82 may comprise a remote transceiver 84 so that the controller 82 is in wireless communication with the actuator 62 and so that the actuator 62 can be activated remotely, as is depicted in FIGS. 1 and 6 wherein a simplified hand-held controlling device 86 is shown for the controller 82. Such a simplified hand-held controlling device 86 might be used for controlling a single gravity feed control device 10. The present invention anticipates other controlling devices that would allow for one or more of:

i. controlling of multiple gravity feed control devices 10, display of position of the sliding door 12, ii. using a timing function for controlling when and for how long the sliding door 12 is opened, and ii. selective positioning of the sliding door 12 in partially opened positions and a fully opened position.

The present invention also anticipates multiple gravity feed control devices 10 being wired to a central controlling device (not shown), such as a computer.

Figure 4:
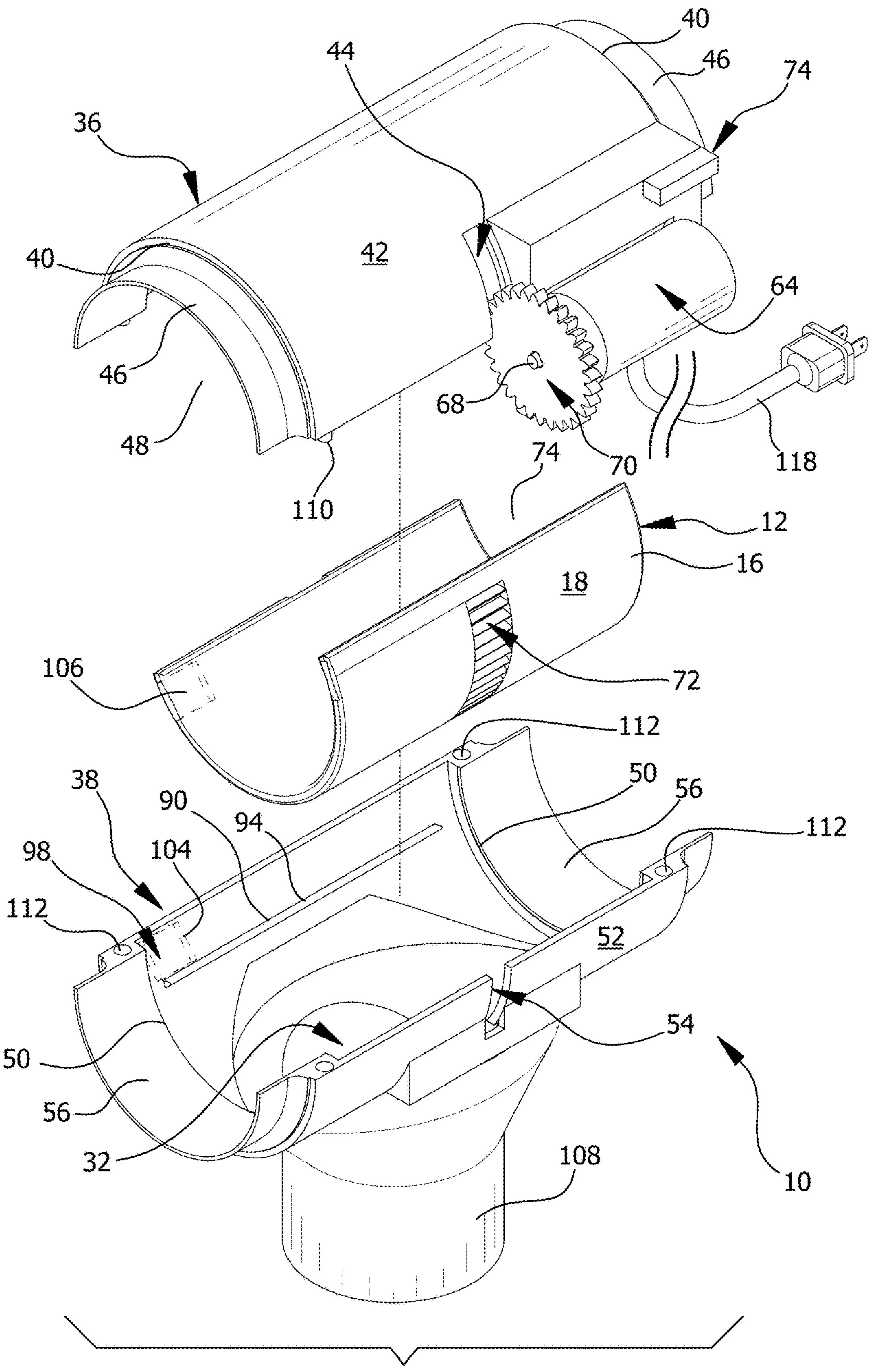
FIG. 4 is an exploded view of an embodiment of the disclosure.
Figure 5:
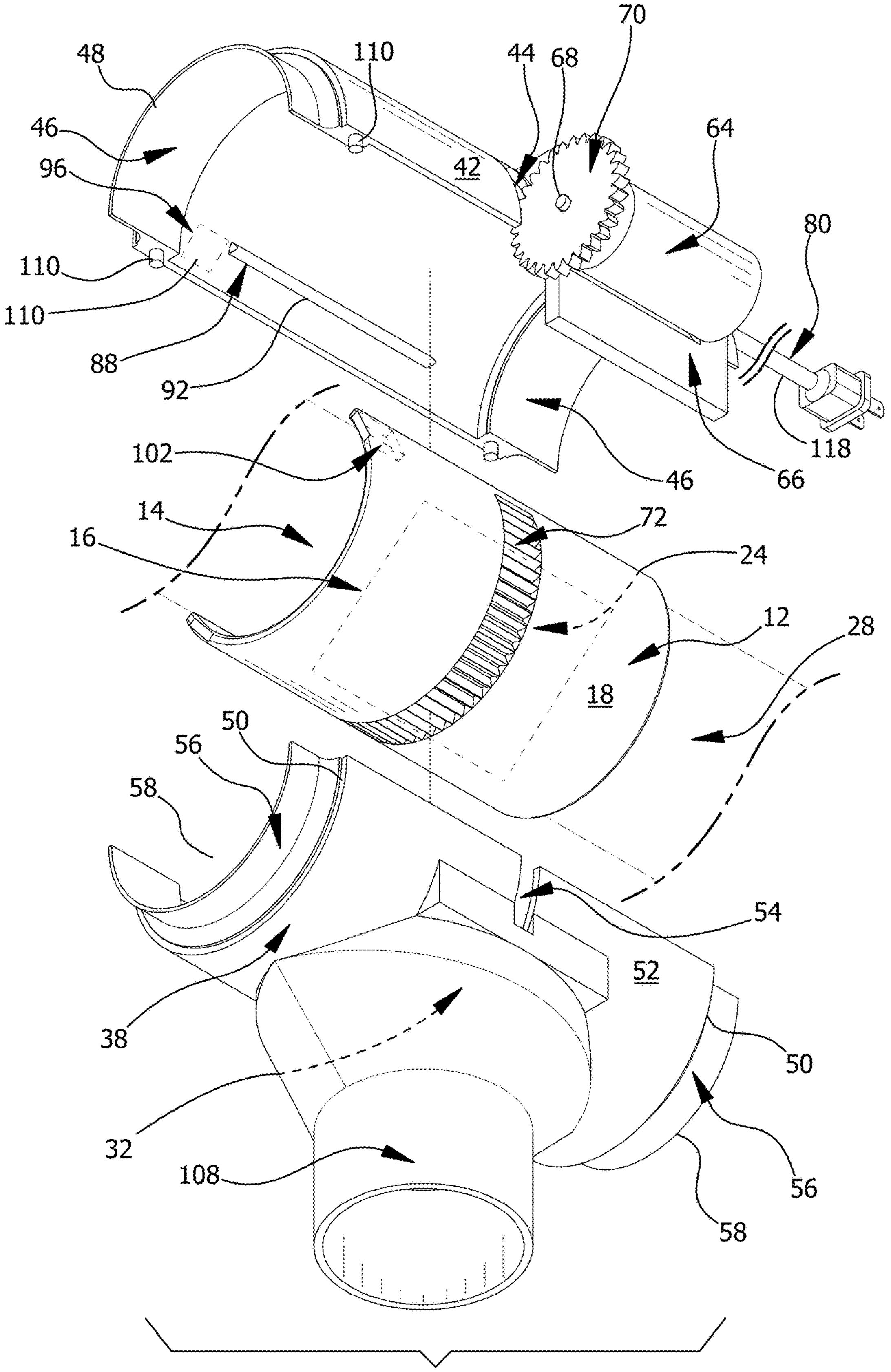
FIG. 5 is an exploded view of an embodiment of the disclosure.

An upper limiter 88 is attached to the upper half pipe 36 and is positioned to contact and to stop the sliding door 12 upon the feed opening 24 being fully opened. A lower limiter 90 is attached to the lower half pipe 38 and is positioned to contact and to stop the sliding door 12 upon the feed opening 24 being fully closed. The upper limiter 88 and the lower limiter 90 may comprise an upper bar 92 and a lower bar 94, respectively, as is shown in FIGS. 5 and 4, respectively, or other limiting means, such as, but not limited to, nubs, constrictions in the pipe overlay 20, or the like. The upper bar 92 and the lower bar 94 are envisioned as particularly applicable in a gravity feed control device 10 that is used in a large application, wherein the motor 64 is three phased and the controller 82 incorporates a Variable Frequency Drive (VFD) device (not shown) as the VFD device could stop the sliding door 12 when the current rises due to the sliding door 12 contacting either the upper bar 92 or the lower bar 94.

The gravity feed control device 10 also may include a first sensing unit 96 and a second sensing unit 98 which are operatively coupled to the microcontroller 78. The first sensing unit 96 is attached to the pipe overlay 20 and is positioned to be activated with the sliding door 12 is in the first configuration. The first sensing unit 96 signals the microcontroller 78 to deactuate the motor 64 and to actuate the unit transceiver 76 to signal a status of the feed opening 24 to the controller 82. The second sensing unit 98 is attached to the pipe overlay 20 and is positioned to be activated with the sliding door 12 in the second configuration with the feed opening 24 fully open. The second sensing unit 98 signals the microcontroller 78 to deactuate the motor 64 and to actuate the unit transceiver 76 to signal the status of the feed opening 24 to the controller 82.

The first sensing unit 96 may comprise a first magnetic switch 100, which is attached to the lower half pipe 38, and a first magnet 102, which is attached to the sliding door 12. The second sensing unit 98 may comprise a second magnetic switch 104, which is attached to the upper half pipe 36, and a second magnet 106, which is attached to the sliding door 12. The first sensing unit 96 and the second sensing unit 98 also may comprise other types of positional sensors, such as, but not limited to, contact sensors, optical proximity sensors, or the like.

The gravity feed control device 10 also may include a drop tube 108, which is attached to and which extends from the lower half pipe 38. The drop tube 108 extends circumferentially around the aperture 32 and is configured to direct the flowable material 116.

Also anticipated by the present invention is the upper half pipe 36 being formed with pegs 110 and the lower half pipe 38 being formed with recesses 112, as is shown in FIGS. 4 and 5, to assure proper alignment of the upper half pipe 36 with the lower half pipe 38 when fastening the pipe overlay 20 to the feed pipe 28.

The gravity feed control device 10 enables a method for remote automation of a gravity feed station 114. The method 114 entails positioning the sliding door 12 of the gravity feed control device 10, as per the specification above, over the feed opening 24 in the bottom half 26 of the feed pipe 28 having the outside diameter 30 that is complementary to the internal diameter 14 of the sliding door 12. The pipe overlay 20 then is positioned around the feed pipe 28 to slidably retain the sliding door 12 within the cavity 34 defined by the pipe overlay 20 and the feed pipe 28. The pipe overlay 20 is attached to the feed pipe 28 by tightening the gear clamps 60 around each first half flange 46 and its associated second half flange 56. The controller 82 then can be utilized to selectively activate the actuator 62. Sliding, by the actuator 62, of the sliding door 12 between the first and second configurations enables flowing of the flowable material 116 from the feed pipe 28 through the aperture 32. The step of sliding, by the actuator 62, of the sliding door 12, may comprise the motor 64 selectively rotating the pinion gear 70. The step of utilizing the controller 82 to selectively activating the actuator 62 may be performed wirelessly.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A gravity feed control device comprising:

a sliding door being half-pipe shaped and having an internal diameter and an external diameter, wherein the sliding door is configured for positioning over and covering a feed opening in a bottom half of a feed pipe having an outside diameter complementary to the internal diameter of the sliding door;

a pipe overlay having an inner diameter complementary to the external diameter, the pipe overlay having an aperture positioned therein and being adapted for selectively attaching to the feed pipe, wherein the pipe overlay is configured for positioning around and fastening to the feed pipe such that the aperture is aligned with the feed opening and such that the sliding door is slidably retained within a cavity defined by the pipe overlay and the feed pipe;

an actuator being attached to the pipe overlay and operatively engaged to the sliding door; and a controller being in communication with the actuator for selectively activating the actuator for sliding the sliding door between a first configuration, wherein the feed opening is closed by the sliding door, and a second configuration, wherein the sliding door is slid within the cavity such that the feed opening is at least partially open and such that a flowable material can pass from the feed pipe through the aperture.

2. The gravity feed control device of claim 1, wherein the pipe overlay comprises:

an upper half pipe having a front face, the front face having a first slot extending thereinto; and a lower half pipe having a forward face, the forward face having a second slot extending thereinto, the aperture being substantially centrally positioned in the lower half pipe, the lower half pipe being selectively attachable to the upper half pipe for generating the pipe overlay with the second slot being in alignment with the first slot.

3. The gravity feed control device of claim 2, further including:

the upper half pipe having opposite ends;

a pair of first half flanges being attached singly to the opposite ends of the upper half pipe, each first half flange having an inward diameter complementary to the outside diameter of the feed pipe;

the lower half pipe having opposing ends;

a pair of second half flanges being attached singly to the opposing ends of the lower half pipe, each second half flange having an interior diameter complementary to the outside diameter of the feed pipe; and wherein each first half flange and an associated second half flange are configured for tightening to the feed pipe using a respective gear clamp for attaching the pipe overlay to the feed pipe.

4. The gravity feed control device of claim 2, further including:

the sliding door having an outer face; and the actuator comprising:

a motor being attached to the upper half pipe, the motor being reversible and comprising a shaft;

a pinion gear being attached to the shaft and extending through the first slot and the second slot; and a rack gear extending into the outer face of the sliding door, the rack gear being gearedly engaged to the pinion gear.

5. The gravity feed control device of claim 4, further including a mounting plate being attached to and positioned between the motor and the upper half pipe.

6. The gravity feed control device of claim 5, further including:

a control module being attached to the pipe overlay, the control module comprising:

a unit transceiver; and a microcontroller being operatively coupled to the motor and the unit transceiver; and the controller comprising a remote transceiver such that the controller is in wireless communication with the actuator and such that the actuator can be activated remotely.

7. The gravity feed control device of claim 6, further including a power module being operatively coupled to the control module.

8. The gravity feed control device of claim 7, wherein the power module comprises a power cord.

9. The gravity feed control device of claim 6, further including:

a first sensing unit being attached to the pipe overlay and operatively coupled to the microcontroller, the first sensing unit being positioned such that the first sensing unit is activated with the sliding door in the first configuration, thereby signaling the microcontroller for deactuating the motor and for actuating the unit transceiver for signaling a status of the feed opening to the controller; and a second sensing unit being attached to the pipe overlay and operatively coupled to the microcontroller, the second sensing unit being positioned such that the second sensing unit is activated with the sliding door in the second configuration with the feed opening fully open, thereby signaling the microcontroller for deactuating the motor and for actuating the unit transceiver for signaling the status of the feed opening to the controller.

10. The gravity feed control device of claim 9, wherein:

the first sensing unit comprises:

a first magnetic switch attached to the lower half pipe; and a first magnet attached to the sliding door; and the second sensing unit comprises:

a second magnetic switch attached to the upper half pipe; and a second magnet attached to the sliding door.

11. The gravity feed control device of claim 2, further including:

an upper limiter being attached to the upper half pipe and being positioned for contacting and stopping the sliding door upon the feed opening being fully opened; and a lower limiter being attached to the lower half pipe and being positioned for contacting and stopping the sliding door upon the feed opening being fully closed.

12. The gravity feed control device of claim 11, wherein:

the upper limiter comprises an upper bar; and the lower limiter comprises a lower bar.

13. The gravity feed control device of claim 5, further including a drop tube being attached to and extending from the lower half pipe, the drop tube extending circumferentially around the aperture, wherein the drop tube is configured for directing the flowable material.

14. The gravity feed control device of claim 1, further including:

the sliding door having an outer face;

the pipe overlay comprising:

an upper half pipe having a front face and opposite ends, the front face having a first slot extending thereinto; and a lower half pipe having a forward face and opposing ends, the forward face having a second slot extending thereinto, the aperture being substantially centrally positioned in the lower half pipe; the lower half pipe being selectively attachable to the upper half pipe for generating the pipe overlay with the second slot being in alignment with the first slot;

a pair of first half flanges being attached singly to the opposite ends of the upper half pipe, each first half flange having an inward diameter complementary to the outside diameter of the feed pipe;

a pair of second half flanges being attached singly to the opposing ends of the lower half pipe, each second half flange having an interior diameter complementary to the outside diameter of the feed pipe; and wherein each first half flange and an associated second half flange are configured for tightening to the feed pipe using a respective gear clamp for attaching the pipe overlay to the feed pipe;

the actuator comprising:

a motor being attached to the upper half pipe, the motor being reversible and comprising a shaft;

a pinion gear being attached to the shaft and extending through the first slot and the second slot; and a rack gear extending into the outer face of the sliding door, the rack gear being gearedly engaged to the pinion gear;

a mounting plate being attached to and positioned between the motor and the upper half pipe;

a control module being attached to the pipe overlay, the control module comprising:

a unit transceiver; and a microcontroller being operatively coupled to the motor and the unit transceiver;

a power module being operatively coupled to the control module, the power module comprising a power cord;

the controller comprising a remote transceiver such that the controller is in wireless communication with the actuator and such that the actuator can be activated remotely; and a drop tube being attached to and extending from the lower half pipe, the drop tube extending circumferentially around the aperture, wherein the drop tube is configured for directing the flowable material.

15. The gravity feed control device of claim 1, further including:

an upper limiter being attached to the upper half pipe and being positioned for contacting and stopping the sliding door upon the feed opening being fully opened, the upper limiter comprising an upper bar; and a lower limiter being attached to the lower half pipe and being positioned for contacting and stopping the sliding door upon the feed opening being fully closed, the lower limiter comprising a lower bar.

16. The gravity feed control device of claim 1, further including:

a first sensing unit being attached to the pipe overlay and operatively coupled to the microcontroller, the first sensing unit being positioned such that the first sensing unit is activated with the sliding door in the first configuration, thereby signaling the microcontroller for deactuating the motor and for actuating the unit transceiver for signaling a status of the feed opening to the controller, the first sensing unit comprising:

a first magnetic switch attached to the lower half pipe; and a first magnet attached to the sliding door; and a second sensing unit being attached to the pipe overlay and operatively coupled to the microcontroller, the second sensing unit being positioned such that the second sensing unit is activated with the sliding door in the second configuration with the feed opening fully open, thereby signaling the microcontroller for deactuating the motor and for actuating the unit transceiver for signaling the status of the feed opening to the controller, the second sensing unit comprising:

a second magnetic switch attached to the upper half pipe; and a second magnet attached to the sliding door.

17. A method for converting a gravity feed station for remote automation, the method comprising the steps of:

positioning a sliding door, which is half-pipe shaped and which has an internal diameter and an external diameter, over a feed opening in a bottom half of a feed pipe having an outside diameter complementary to the internal diameter of the sliding door;

positioning a pipe overlay having an inner diameter complementary to the external diameter around the feed pipe such that the sliding door is slidably retained within a cavity defined by the pipe overlay and the feed pipe, the pipe overlay comprising:

an upper half pipe having opposite ends;

a lower half pipe having opposing ends and an aperture centrally positioned therein, the aperture being aligned with the feed opening;

a pair of first half flanges being attached singly to the opposite ends of the upper half pipe, each first half flange having an inward diameter complementary to the outside diameter of the feed pipe; and a pair of second half flanges being attached singly to the opposing ends of the lower half pipe, each second half flange having an interior diameter complementary to the outside diameter of the feed pipe;

attaching the pipe overlay to the feed pipe by tightening a respective gear clamp around each first half flange and an associated second half flange;

utilizing a controller in communication with an actuator operatively engaged to the sliding door for selectively activating the actuator;

sliding, by the actuator, of the sliding door between a first configuration, wherein the feed opening is closed by the sliding door, and a second configuration, wherein the sliding door is slid such that the feed opening is at least partially open; and flowing of a flowable material from the feed pipe through the aperture.

18. The method of claim 17, further including:

the upper half pipe having a front face, the front face having a first slot extending thereinto;

a lower half pipe having a forward face, the forward face having a second slot extending thereinto;

the sliding door having an outer face;

the actuator comprising:

a motor being attached to the upper half pipe, the motor being reversible and comprising a shaft;

a pinion gear being attached to the shaft and extending through the first slot and the second slot; and a rack gear extending into the outer face of the sliding door, the rack gear being gearedly engaged to the pinion gear; and the step of sliding, by the actuator, of the sliding door comprising the motor selectively rotating the pinion gear.

19. The method of claim 18, further including:

a control module being attached to the pipe overlay, the control module comprising:

a unit transceiver; and a microcontroller being operatively coupled to the motor and the unit transceiver;

the controller comprising a remote transceiver such that the controller is in wireless communication with the actuator and such that the actuator can be activated remotely; and the step of utilizing the controller for selectively activating the actuator being performed wirelessly.

* * * * *